United States Patent
Shinohara et al.

(10) Patent No.: US 9,534,307 B2
(45) Date of Patent: *Jan. 3, 2017

(54) SILVER-PLATED PRODUCT AND METHOD FOR PRODUCING SAME

(71) Applicant: DOWA METALTECH CO., LTD., Tokyo (JP)

(72) Inventors: Keisuke Shinohara, Saitama (JP); Masafumi Ogata, Saitama (JP); Hiroshi Miyazawa, Saitama (JP); Akira Sugawara, Shizuoka (JP)

(73) Assignee: Dowa Metaltech Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/430,653

(22) PCT Filed: Sep. 17, 2013

(86) PCT No.: PCT/JP2013/075605
§ 371 (c)(1),
(2) Date: Mar. 24, 2015

(87) PCT Pub. No.: WO2014/050772
PCT Pub. Date: Apr. 3, 2014

(65) Prior Publication Data
US 2015/0259815 A1    Sep. 17, 2015

(30) Foreign Application Priority Data

Sep. 27, 2012 (JP) .................. 2012-214259
Mar. 15, 2013 (JP) .................. 2013-053143
Sep. 4, 2013 (JP) .................. 2013-182736

(51) Int. Cl.
| | |
|---|---|
| B32B 15/01 | (2006.01) |
| C25D 3/46 | (2006.01) |
| C25D 7/00 | (2006.01) |
| C25D 5/50 | (2006.01) |
| H01R 13/03 | (2006.01) |
| H01H 1/02 | (2006.01) |

(Continued)

(52) U.S. Cl.
CPC .............. *C25D 3/46* (2013.01); *B32B 15/018* (2013.01); *C22C 5/06* (2013.01); *C22C 9/00* (2013.01);
(Continued)

(58) Field of Classification Search
None
See application file for complete search history.

(56) References Cited

U.S. PATENT DOCUMENTS

| | | |
|---|---|---|
| 2,777,810 A | 1/1957 | Ostrow |
| 4,155,817 A | 5/1979 | Fletcher et al. |

(Continued)

FOREIGN PATENT DOCUMENTS

| | | |
|---|---|---|
| EP | 1609888 A2 | 12/2005 |
| EP | 1939331 A1 | 7/2008 |

(Continued)

OTHER PUBLICATIONS

European Search Report for EP 13 842 760.4 dated Apr. 25, 2016.

*Primary Examiner* — Daniel J Schleis
(74) *Attorney, Agent, or Firm* — Bachman & LaPointe, PC

(57) ABSTRACT

In a silver-plated product wherein a surface layer of silver is formed on the surface of a base material or on the surface of an underlying layer formed on the base material, the surface layer of silver is formed by electroplating in a silver plating bath which contains 1 to 15 mg/L of selenium and wherein a mass ratio of silver to free cyanogen is in the range of from 0.9 to 1.8, and thereafter, an aging treatment is carried out to produce a silver-plated product wherein an area fraction in {200} orientation of the surface layer is 15% or more.

4 Claims, 5 Drawing Sheets

(51) Int. Cl.
  *C22C 5/06* (2006.01)
  *C22C 9/00* (2006.01)
  *C22F 1/08* (2006.01)
  *C22F 1/14* (2006.01)
  *H01H 1/023* (2006.01)
  *H01H 11/04* (2006.01)
  *H01H 1/025* (2006.01)

(52) U.S. Cl.
  CPC . *C22F 1/08* (2013.01); *C22F 1/14* (2013.01); *C25D 5/50* (2013.01); *C25D 7/00* (2013.01); *H01H 1/02* (2013.01); *H01H 1/023* (2013.01); *H01H 11/041* (2013.01); *H01R 13/03* (2013.01); *H01H 1/025* (2013.01); *H01H 11/045* (2013.01); *H01H 2011/046* (2013.01); *H01R 2201/26* (2013.01); *Y10T 428/12896* (2015.01)

(56) References Cited

U.S. PATENT DOCUMENTS

| | | | |
|---|---|---|---|
| 5,520,492 A * | 5/1996 | Ohmi | F16C 33/12 285/386 |
| 7,235,143 B2 * | 6/2007 | Perry | C22C 5/04 148/430 |
| 7,514,022 B2 | 4/2009 | Miyazawa et al. | |
| 7,740,723 B2 * | 6/2010 | Perry | C22C 5/04 148/577 |
| 8,273,465 B2 * | 9/2012 | Izumida | B32B 15/013 205/263 |
| 2005/0282006 A1 | 12/2005 | Miyazawa et al. | |
| 2009/0229987 A1 * | 9/2009 | Miyazawa | C25D 15/02 205/109 |
| 2015/0037608 A1 | 2/2015 | Shinohara et al. | |

FOREIGN PATENT DOCUMENTS

| | | |
|---|---|---|
| JP | 2006307277 | 11/2006 |
| JP | 3889718 | 3/2007 |
| JP | 4279285 | 6/2009 |
| JP | 2010146926 | 7/2010 |
| JP | 20100253045 | 11/2010 |
| JP | 2012162775 | 8/2012 |
| WO | 2013047628 | 4/2013 |
| WO | 2013137121 A1 | 9/2013 |

* cited by examiner

SILVER-PLATED PRODUCT AND METHOD FOR PRODUCING SAME

TECHNICAL FIELD

The present invention generally relates to a silver-plated product and a method for producing the same. More specifically, the invention relates to a silver-plated product used as the material of contact and terminal parts, such as connectors, switches and relays, which are used for on-vehicle and/or household electric wiring, and a method for producing the same.

BACKGROUND ART

As conventional materials of contact and terminal parts, such as connectors and switches, there are used plated products wherein a base material of stainless steel, copper, a copper alloy or the like, which is relatively inexpensive and which has excellent corrosion resistance, mechanical characteristics and so forth, is plated with tin, silver, gold or the like in accordance with required characteristics, such as electrical and soldering characteristics.

Tin-plated products obtained by plating a base material of stainless steel, copper, a copper alloy or the like, with tin are inexpensive, but they do not have good corrosion resistance in a high-temperature environment. Gold-plated products obtained by plating such a base material with gold have excellent corrosion resistance and high reliability, but the costs thereof are high. On the other hand, silver-plated products obtained by plating such a base material with silver are inexpensive in comparison with gold-plated products and have excellent corrosion resistance in comparison with tin-plated products.

As a silver-plated product obtained by plating a base material of stainless steel, copper, a copper alloy or the like with silver, there is proposed a metal plate for electrical contacts, wherein a silver plating layer having a thickness of 1 micrometer is formed on a copper plating layer having a thickness of 0.1 to 0.5 μm which is formed on a nickel plating layer having a thickness of 0.1 to 0.3 μm which is formed on the surface of a thin base material plate of stainless steel (see, e.g., Japanese Patent No. 3889718). There is also proposed a silver-coated stainless bar for movable contacts, wherein a surface layer of silver or a silver alloy having a thickness of 0.5 to 2.0 μm is formed on an intermediate layer of at least one of nickel, a nickel alloy, copper and a copper alloy having a thickness of 0.05 to 0.2 μm, the intermediate layer being formed on an activated underlying layer of nickel which has a thickness of 0.01 to 0.1 μm and which is formed on a base material of stainless steel (see, e.g., Japanese Patent No. 4279285). Moreover, there is proposed a silver-coated material for movable contact parts, wherein a surface layer of silver or a silver alloy having a thickness of 0.2 to 1.5 μm is formed on an intermediate layer of copper or a copper alloy having a thickness of 0.01 to 0.2 μm, the intermediate layer being formed on an underlying layer of any one of nickel, a nickel alloy, cobalt or a cobalt alloy which has a thickness of 0.005 to 0.1 μm and which is formed on a metallic substrate of copper, a copper alloy, iron or an iron alloy, the arithmetic average roughness Ra of the metallic substrate being 0.001 to 0.2 μm, and the arithmetic average roughness Ra after forming the intermediate layer being 0.001 to 0.1 μm (see, e.g., Japanese patent Laid-Open No. 2010-146925).

However, when conventional silver-plated products are used in a high-temperature environment, there are some possibility that the adhesion properties of the plating film may be deteriorated and/or the contact resistance of the product may be very high. When the silver-plated products proposed in Japanese Patent Nos. 3889718 and 4279285 are used in a high-temperature environment, there are some possibility that the rise of the contact resistance of the product cannot be sufficiently restrained. On the other hand, when the silver-plated product proposed in Japanese Patent Laid-Open No. 2010-146926 is used in a high-temperature environment, the adhesion properties of the plating film are good, and the rise of the contact resistance of the product can be restrained. However, it is required to adjust the arithmetic average roughness Ra of a pressure roll to be 0.001 to 0.2 μm so that the arithmetic average roughness Ra of a metallic substrate, which is transferred by the pressure roll, is adjusted to be 0.001 to 0.2 μm. It is also required to appropriately choose the current density in plating and the kinds of additives in a plating solution during the formation of the intermediate layer to adjust the arithmetic average roughness Ra to be 0.001 to 0.1 μm after forming the intermediate layer, so that the process is complicated and the costs thereof are increased.

For that reason, the applicant has proposed to produce an inexpensive silver-plated product, which has good adhesion properties of the plating film and which can restrain the rise of the contact resistance of the product even if it is used in a high-temperature environment, by causing the crystalline diameter in a direction perpendicular to {111} plane of the surface layer to be 300 angstroms or more in a silver-plated product wherein a surface layer of Ag is formed on an intermediate layer of Cu which is formed on an underlying layer of Ni formed on the surface of a base material of stainless steel (Japanese Patent Application No. 2010-253045).

However, in a silver-plated product wherein a silver plating film is formed on the surface of a base material of copper or a copper alloy, or on the surface of an underlying layer of copper or a copper alloy formed on a base material, there is a problem in that copper diffuses to form CuO on the surface of the silver plating film to raise the contact resistance thereof if it is used in a high-temperature environment. There is also a problem in that cracks are formed in the silver-plated product to expose the base material if the silver-plated product is worked in a complicated shape or in a shape of small contact and terminal parts, such as connectors and switches.

DISCLOSURE OF THE INVENTION

It is therefore an object of the present invention to eliminate the above-described conventional problems and to provide a silver-plated product, which has a good bendability and which can restrain the rise of the contact resistance thereof even if it is used in a high-temperature environment, and a method for producing the same.

In order to accomplish the aforementioned object, the inventors have diligently studied and found that it is possible to produce a silver-plated product, which has a good bendability and which can restrain the rise of the contact resistance thereof even if it is used in a high-temperature environment, if the area fraction in {200} orientation of a surface layer of silver is 15% or more in a silver-plated product wherein the surface layer is formed on the surface of a base material or on the surface of an underlying layer formed on the base material. Thus, the inventors have made the present invention.

According to the present invention, there is provided a silver-plated product comprising: a base material; and a surface layer of silver which is formed on a surface of the base material or on a surface of an underlying layer formed on the base material, wherein an area fraction in {200} orientation of the surface layer is 15% or more.

In this silver-plated product, the surface layer is preferably formed on the surface of the base material of copper or a copper alloy, or on the surface of the underlying layer of copper or a copper alloy formed on the base material.

According to the present invention, there is provided a method for producing a silver-plated product, the method comprising the steps of: preparing a base material; forming a surface layer of silver on a surface of the base material or on a surface of an underlying layer formed on the base material; and thereafter, carrying out an aging treatment, wherein the surface layer is formed by electroplating in a silver plating bath which contains 1 to 15 mg/L of selenium and wherein a mass ratio of silver to free cyanogen is in the range of from 0.9 to 1.8.

In this method for producing a silver-plated product, the aging treatment is preferably carried out by holding at a temperature of 10 to 100° C. for 1 hours or more. The surface layer is preferably formed on the surface of the base material of copper or a copper alloy, or on the surface of the underlying layer of copper or a copper alloy formed on the base material.

According to the present invention, there is provided a contact or terminal part which is made of the above-described silver-plated product.

Throughout the specification, the expression "area fraction in {200} orientation" means a percentage (%) of an area occupied by crystals having {200} orientation directed to a normal direction (ND) to the surface of a silver-plated product (with a permissible deviation in angle of 10° or less), with respect to the area of the surface of the silver-plated product.

According to the present invention, it is possible to produce a silver-plated product, which has a good bendability and which can restrain the rise of the contact resistance thereof even if it is used in a high-temperature environment.

BEST MODE FOR CARRYING OUT THE INVENTION

Figure 1:
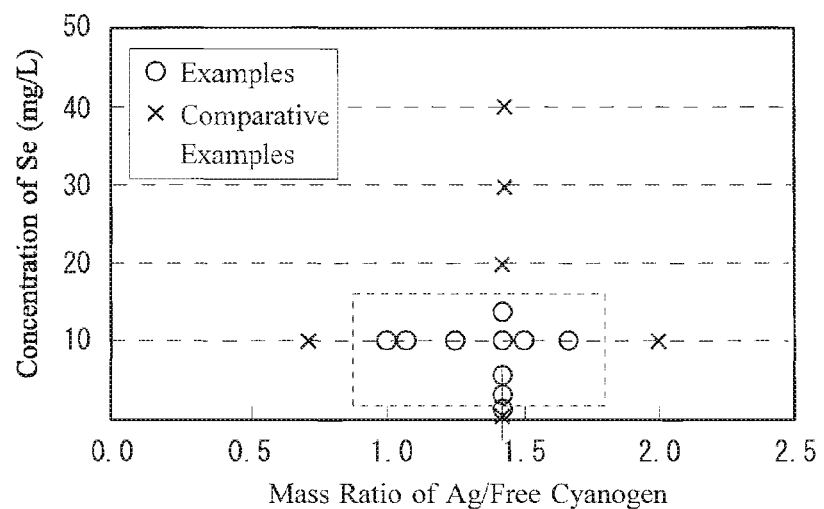
FIG. 1 is a graph showing the concentration of Se with respect to the mass ratio of Ag to free CN in silver plating baths used for producing silver-plated products in Examples and Comparative Examples.

In the preferred embodiment of a silver-plated product according to the present invention, a surface layer of silver is formed on the surface of a base material or on the surface of an underlying layer formed on the base material, and the area fraction in {200} orientation of the surface layer of silver is 15% or more, preferably 20% or more, and more preferably 25% or more. Furthermore, if the area fraction in {200} orientation of the surface layer of the silver-plated product is higher, it is possible to further improve the bendability of the silver-plated product and to further restrain the rise of the contact resistance thereof even if it is used in a high-temperature environment.

In this silver-plated product, the surface layer of silver is preferably formed on the surface of the base material of copper or a copper alloy, or on the surface of the underlying layer of copper or a copper alloy formed on the base material.

Furthermore, the surface layer of the silver-plated product contains silver, and may be made of a silver alloy if the area fraction in {200} orientation of the surface layer is 15% or more. The thickness of the surface layer of silver is preferably in the range of from 0.5 μm to 20 μm.

As the preferred embodiment of a method for producing a silver-plated product according to the present invention, in a method for producing a silver-plated product wherein a surface layer of silver is formed on the surface of a base material or on the surface of an underlying layer formed on the base material, the surface layer is formed by electroplating in a silver plating bath which contains 1 to 15 mg/L of selenium and wherein a mass ratio of silver to free cyanogen is in the range of from 0.9 to 1.8, and thereafter, an aging treatment is carried out. If the content of selenium in the silver plating bath and/or the mass ratio of silver to free cyanogen are beyond the above limits, it is not possible to increase the area fraction in {200} orientation of the surface layer of the silver-plated product.

In this method for producing a silver-plated product, the aging treatment is preferably carried out by holding at a temperature of 10 to 100° C. for 1 hour or more. This aging treatment may be carried out by means of a temperature and humidity testing chamber or the like in order to hold aging conditions, or may be carried out by allowing to stand in an open system (open space) if conditions are satisfied. The surface layer of silver is preferably formed on the surface of the base material of copper or a copper alloy, or on the surface of the underlying layer of copper or a copper alloy formed on the base material. Furthermore, during the electroplating, the temperature of the solution is preferably 10 to 40° C., more preferably 15 to 30° C., and the current density is preferably 1 to 15 A/dm$^2$, more preferably 3 to 10 A/dm$^2$.

The silver plating bath is preferably a silver plating bath which comprises silver potassium cyanide (KAg(CN)$_2$), potassium cyanide (KCN), and 2 to 30 mg/L of potassium selenocyanate (KSeCN) and wherein the concentration of selenium in the silver plating bath is 1 to 15 mg/L, the mass ratio of silver to free cyanogen being in the range of from 0.9 to 1.8.

Furthermore, before the surface layer of silver is formed, an electrolytic degreasing or dipping degreasing is preferably carried out for removing adhesion substances and so forth from the base material (a material to be plated), and pickling is preferably carried out for removing oxides and so forth from the base material. Before the silver plating is carried out, a silver-strike-plating may be carried out.

Examples of a silver-plated product and a method for producing the same according to the present invention will be described below in detail.

Example 1

First, a pure copper plate having a size of 67 mm×50 mm×0.3 mm was prepared as a base material (a material to be plated). The material to be plated and a SUS plate were put in an alkali degreasing solution to be used as a cathode and an anode, respectively, to carry out electrolytic degreasing at 5 V for 30 seconds. The material thus electrolytic-degreased was washed, and then, pickled for 15 seconds in a 3% sulfuric acid.

Then, the material to be plated and a titanium electrode plate coated with platinum were used as a cathode and an anode, respectively, to electroplate (silver-strike-plate) the material at a current density of 2.5 A/dm$^2$ for 10 seconds in a silver strike plating bath comprising 3 g/L of silver potassium cyanide and 90 g/L of potassium cyanide while stirring the solution at 400 rpm by a stirrer.

Then, the material to be plated and a silver electrode plate were used as a cathode and an anode, respectively, to electroplate (silver-plate) the material at a current density of 5 A/dm$^2$ and a liquid temperature of 18° C. in a silver plating bath comprising 74 g/L of silver potassium cyanide (KAg(CN)$_2$), 100 g/L of potassium cyanide and 18 mg/L of potassium selenocyanate (KSeCN), while stirring the solution at 400 rpm by a stirrer, until a silver plating film having a thickness of 3 μm was formed. Furthermore, in the used silver plating bath, the concentration of Se was 10 mg/L, and the concentration of Ag was 40 g/L, the concentration of free CN being 40 g/L, and the mass ratio of Ag to free CN being 1.00.

Then, an aging treatment for allowing and holding the material thus plated with silver to stand at a temperature of 25° C., a relative humidity of 50 RT %, atmospheric pressure in an atmosphere of air for 24 hours was carried out.

With respect to a silver-plated product thus produced, an area fraction in {200} orientation thereof was calculated, and the contact resistances thereof before and after a heat-proof test and the bendability thereof were evaluated.

The area fraction in {200} orientation of the silver-plated product was obtained by calculating a proportion occupied by crystals having {200} orientation directed to a normal direction (ND) to the surface of the silver-plated product (with a permissible deviation in angle of 10° or less), by the electron backscatter diffraction (EBSD) using a crystal analysis tool for scanning electron microscope (OIM produced by TSL solutions Co., Ltd.), after measuring a square of 100 μm×100 μm on the surface of the silver-plated product at a step of 0.4 μm by means of a thermal field emission-type scanning electron microscope (JSM-7800F produced by JEOL Ltd.). As a result, the area fraction in {200} orientation was 36.7%. The theoretical value of the area fraction in {200} orientation of a silver-plated product having non-orientation (an imaginary silver-plated product wherein crystals forming a silver plating film are oriented at random) is about 4.6%. As compared with this silver-plated product having non-orientation, most of crystals in the silver plating film of the surface layer of the silver-plated product in this example are strongly oriented so that {200} plane is directed to the surface (plate surface) of the silver-plated product ({200} orientation is directed to the normal direction (ND) to the surface of the silver-plated product).

The heat resisting property of the silver-plated product was evaluated by measuring a contact resistance thereof at a load of 50 gf by means of an electrical contact simulator (CRS-1 produced by Yamasaki-Seiki Co., Ltd.) before and after a heat-proof test in which the silver-plated product was heated at 200° C. for 144 hours by means of a dryer (OF450 produced by AS ONE Corporation). As a result, the contact resistance of the silver-plated product was 0.9 mΩ before the heat-proof test and 2.3 mΩ after the heat-proof test. Thus, the contact resistance after the heat-proof test was a good value which was not higher than 5 mΩ, so that the rise of the contact resistance was restrained after the heat-proof test.

The bendability of the silver-plated product was evaluated on the basis of the presence of exposure of the base material in a bent portion of the silver-plated product by observing the bent portion at a power of 1000 by means of a microscope (Digital Microscope VHX-1000 produced by KEYENCE CORPORATION) after the silver-plated product was bent by 90 degrees at R=0.1 in a direction perpendicular to the direction of rolling of the base material in accordance with the V-block method described in Japanese Industrial Standard (JIS) Z2248. As a result, the exposure of the base material was not observed, so that the bendability of the silver-plated product was good.

Example 2

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 111 g/L of silver potassium cyanide, 100 g/L of potassium cyanide and 18 mg/L of potassium selenocyanate, while stirring the solution at 400 rpm by a stirrer, until a silver plating film having a thickness of 3 μm was formed. Furthermore, in the used silver plating bath, the concentration of Se was 10 mg/L, and the concentration of Ag was 60 g/L, the concentration of free CN being 40 g/L, and the mass ratio of Ag to free CN being 1.51.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 41.9%. The contact resistance of the silver-plated product was 0.8 mΩ before the heat-proof test and 2.5 mΩ after the heat-proof test. Thus, the contact resistance after the heat-proof test was a good value which was not higher than 5 mΩ so that the rise of the contact resistance was restrained after the heat-proof test. Moreover, the exposure of the base material was not observed in the silver-plated product after bending, so that the bendability of the silver-plated product was good.

Example 3

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 111 g/L of silver potassium cyanide, 120 g/L of potassium cyanide and 18 mg/L of potassium selenocyanate, while stirring the solution at 400 rpm by a stirrer, until a silver plating film having a thickness of 3 μm was formed. Furthermore, in the used silver plating bath, the concentration of Se was 10 mg/L, and the concentration of Ag was 60 g/L, the concentration of free CN being 48 g/L, and the mass ratio of Ag to free CN being 1.26.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 43.2%. The contact resistance of the silver-plated product was 0.9 mΩ before the heat-proof test and 2.5 mΩ after the heat-proof test. Thus, the contact resistance after the heat-proof test was a good value which was not higher than 5 mΩ, so that the rise of the contact resistance was restrained after the heat-proof test. Moreover, the exposure of the base material was not observed in the silver-plated product after bending, so that the bendability of the silver-plated product was good.

Example 4

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 111 g/L of silver potassium cyanide, 140 g/L of potassium cyanide and 18 mg/L of potassium selenocyanate, while stirring the solution at 400 rpm by a stirrer, until a silver plating film having a thickness of 3 μm was formed. Furthermore, in the used silver plating bath, the concentration of Se was 10 mg/L, and the concentration of Ag was 60 g/L, the concentration of free CN being 56 g/L, and the mass ratio of Ag to free CN being 1.08.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 37.9%. The contact resistance of the silver-plated product was 0.8 mΩ before the heat-proof test and 3.2 mΩ after the heat-proof test. Thus, the contact resistance after the heat-proof test was a good value which was not higher than 5 mΩ, so that the rise of the contact resistance was restrained after the heat-proof test. Moreover, the exposure of the base material was not observed in the silver-plated product after bending, so that the bendability of the silver-plated product was good.

Example 5

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 148 g/L of silver potassium cyanide, 120 g/L of potassium cyanide and 18 mg/L of potassium selenocyanate, while stirring the solution at 400 rpm by a stirrer, until a silver plating film having a thickness of 3 μm was formed. Furthermore, in the used silver plating bath, the concentration of Se was 10 mg/L, and the concentration of Ag was 80 g/L, the concentration of free CN being 48 g/L, and the mass ratio of Ag to free CN being 1.67.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 45.9%. The contact resistance of the silver-plated product was 0.7 mΩ before the heat-proof test and 2.0 mΩ after the heat-proof test. Thus, the contact resistance after the heat-proof test was a good value which was not higher than 5 mΩ, so that the rise of the contact resistance was restrained after the heat-proof test. Moreover, the exposure of the base material was not observed in the silver-plated product after bending, so that the bendability of the silver-plated product was good.

Example 6

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C., in a silver plating bath comprising 148 g/L of silver potassium cyanide, 140 g/L of potassium cyanide and 18 mg/L of potassium selenocyanate, while stirring the solution at 400 rpm by a stirrer, until a silver plating film having a thickness of 3 μm was formed. Furthermore, in the used silver plating bath, the concentration of Se was 10 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 41.6%. The contact resistance of the silver-plated product was 0.9 mΩ before the heat-proof test and 2.4 mΩ after the heat-proof test. Thus, the contact resistance after the heat-proof test was a good value which was not higher than 5 mΩ, so that the rise of the contact resistance was restrained after the heat-proof test. Moreover, the exposure of the base material was not observed in the silver-plated product after bending, so that the bendability of the silver-plated product was good.

Example 7

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 148 g/L of silver potassium cyanide, 140 g/L of potassium cyanide and 11 mg/L of potassium selenocyanate, while stirring the solution at 400 rpm by a stirrer, until a silver plating film having a thickness of 3 μm was formed. Furthermore, in the used silver plating bath, the concentration of Se was 6 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 44.4%. The contact resistance of the silver-plated product was 1.0 mΩ before the heat-proof test and 2.4 mΩ after the heat-proof test. Thus, the contact resistance after the heat-proof test was a good value which was not higher than 5 mΩ, so that the rise of the contact resistance was restrained after the heat-proof test. Moreover, the exposure of the base material was not observed in the silver-plated product after bending, so that the bendability of the silver-plated product was good.

Example 8

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 148 g/L of silver potassium cyanide, 140 g/L of potassium cyanide and 26 mg/L of potassium selenocyanate, while stirring the solution at 400 rpm by a stirrer, until a silver plating film having a thickness of 3 μm was formed. Furthermore, in the used silver plating bath, the concentration of Se was 14 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 42.2%. The contact resistance of the silver-plated product was 0.8 mΩ before the heat-proof test and 3.6 mΩ after the heat-proof test. Thus, the contact resistance after the heat-proof test was a good value which was not higher than 5 mΩ, so that the rise of the contact resistance was restrained after the heat-proof test. Moreover, the exposure of the base material was not observed in the silver-plated product after bending, so that the bendability of the silver-plated product was good.

Example 9

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 148 g/L of silver potassium cyanide, 140 g/L of potassium cyanide and 2 mg/L of potassium selenocyanate, while stirring the solution at 400 rpm by a stirrer, until a silver plating film having a thickness of 3 μm was formed. Furthermore, in the used silver plating bath, the concentration of Se was 1 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 27.8%. The contact resistance of the silver-plated product was 1.0 mΩ before the heat-proof test and 3.9 mΩ after the heat-proof test. Thus, the contact resistance after the heat-proof test was a good value which was not higher than 5 mΩ, so that the rise of the contact resistance was restrained after the heat-proof test. Moreover, the exposure of the base material was not observed in the silver-plated product after bending, so that the bendability of the silver-plated product was good.

Example 10

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C., in a silver plating bath comprising 148 g/L of silver potassium cyanide, 140 g/L of potassium cyanide and 6 mg/L of potassium selenocyanate, while stirring the solution at 400 rpm by a stirrer, until a silver plating film having a thickness of 3 μm was formed. Furthermore, in the used silver plating bath, the concentration of Se was 1 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 41.7%. The contact resistance of the silver-plated product was 1.0 mΩ before the heat-proof test and 1.9 mΩ after the heat-proof test. Thus, the contact resistance after the heat-proof test was a good value which was not higher than 5 mΩ, so that the rise of the contact resistance was restrained after the heat-proof test. Moreover, the exposure of the base material was not observed in the silver-plated product after bending, so that the bendability of the silver-plated product was good.

Example 11

A silver-plated product was produced by the same method as that in Example 6, except that an aging treatment was carried out at a temperature of 50° C. using a temperature and humidity testing chamber (Low-temperature quartz temperature and humidity testing chamber λ-201R produced by Isuzu Seisakusho Co. Ltd.).

With respect to a silver-plated product thus produced, the area fraction in {200} orientation thereof was calculated by the same method as that in Example 1. As a result, the area fraction in {200} orientation was 36.1%.

Example 12

A silver-plated product was produced by the same method as that in Example 11, except that the aging temperature was 100° C.

With respect to a silver-plated product thus produced, the area fraction in {200} orientation thereof was calculated by the same method as that in Example 1. As a result, the area fraction in {200} orientation was 31.5%.

Example 13

A silver-plated product was produced by the same method as that in Example 8, except that an aging treatment was carried out at a temperature of 50° C. using the same temperature and humidity testing chamber as that in Example 11.

With respect to a silver-plated product thus produced, the area fraction in {200} orientation thereof was calculated by the same method as that in Example 1. As a result, the area fraction in {200} orientation was 39.2%.

Example 14

A silver-plated product was produced by the same method as that in Example 6, except that electroplating (silver plating) was carried out until a silver plating film having a thickness of 1 μm was formed.

With respect to a silver-plated product thus produced, the area fraction in {200} orientation thereof was calculated by the same method as that in Example 1. As a result, the area fraction in {200} orientation was 32.8%.

Example 15

A silver-plated product was produced by the same method as that in Example 6, except that electroplating (silver plating) was carried out until a silver plating film having a thickness of 5 μm was formed.

With respect to a silver-plated product thus produced, the area fraction in {200} orientation thereof was calculated by the same method as that in Example 1. As a result, the area fraction in {200} orientation was 56.5%.

Example 16

A silver-plated product was produced by the same method as that in Example 6, except that electroplating (silver plating) was carried out until a silver plating film having a thickness of 20 μm was formed.

With respect to a silver-plated product thus produced, the area fraction in {200} orientation thereof was calculated by the same method as that in Example 1. As a result, the area fraction in {200} orientation was 66.7%.

Comparative Example 1

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 74 g/L of silver potassium cyanide, 140 g/L of potassium cyanide and 18 mg/L of potassium selenocyanate, while stirring the solution at 400 rpm by a stirrer, until a silver plating film having a thickness of 3 μm was formed. Furthermore, in the used silver plating bath, the concentration of Se was 10 mg/L, and the concentration of Ag was 40 g/L, the concentration of free CN being 56 g/L, and the mass ratio of Ag to free CN being 0.72.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 8.9%. The contact resistance of the silver-plated product was 0.8 MΩ before the heat-proof test and 5.6 mΩ after the heat-proof test. Thus, the contact resistance after the heat-proof test was not a good value which was not higher than 5 mΩ, so that the contact resistance was raised after the heat-proof test. Moreover, cracks were observed in the silver-plated product after bending, and the base material was exposed, so that the bendability of the silver-plated product was not good.

Comparative Example 2

A silver-plated product was produced by the same method as that in Example 1, except that the material to be plated and a silver electrode plate were used as a cathode and an anode, respectively, to electroplate (silver-plate) the material at a current density of 5 A/dm$^2$ and a liquid temperature of 18° C. in a silver plating bath comprising 148 g/L of silver potassium cyanide, 100 g/L of potassium cyanide and 18 mg/L of potassium selenocyanate, while stirring the solution at 400 rpm by a stirrer, until a silver plating film having a thickness of 3 μm was formed. Furthermore, in the used silver plating bath, the concentration of Se was 10 mg/L, and the concentration of Ag was 80 g/L, the concentration of free CN being 40 g/L, and the mass ratio of Ag to free CN being 2.01.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 5.5%. The contact resistance of the silver-plated product was 0.9 mΩ before the heat-proof test and 12.3 mΩ after the heat-proof test. Thus, the contact resistance after the heat-proof test was not a good value which was not higher than 5 mΩ, so that the contact resistance was raised after the heat-proof test. Moreover, cracks were observed in the silver-plated product after bending, and the base material was exposed, so that the bendability of the silver-plated product was not good.

Comparative Example 3

A silver-plated product was produced by the same method as that in Example 1, except that the material to be plated and a silver electrode plate were used as a cathode and an anode, respectively, to electroplate (silver-plate) the material at a current density of 5 A/dm² and a liquid temperature of 18° C. in a silver plating bath comprising 148 g/L of silver potassium cyanide, 140 g/L of potassium cyanide and 36 mg/L of potassium selenocyanate, while stirring the solution at 400 rpm by a stirrer, until a silver plating film having a thickness of 3 μm was formed. Furthermore, in the used silver plating bath, the concentration of Se was 20 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 4.6%. The contact resistance of the silver-plated product was 0.9 mΩ before the heat-proof test and 15.7 mΩ after the heat-proof test. Thus, the contact resistance after the heat-proof test was not a good value which was not higher than 5 mΩ, so that the contact resistance was raised after the heat-proof test. Moreover, cracks were observed in the silver-plated product after bending, and the base material was exposed, so that the bendability of the silver-plated product was not good.

Comparative Example 4

A silver-plated product was produced by the same method as that in Example 1, except that the material to be plated and a silver electrode plate were used as a cathode and an anode, respectively, to electroplate (silver-plate) the material at a current density of 5 A/dm² and a liquid temperature of 18° C. in a silver plating bath comprising 148 g/L of silver potassium cyanide, 140 g/L of potassium cyanide and 55 mg/L of potassium selenocyanate, while stirring the solution at 400 rpm by a stirrer, until a silver plating film having a thickness of 3 μm was formed. Furthermore, in the used silver plating bath, the concentration of Se was 30 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 3.9%. The contact resistance of the silver-plated product was 0.7 MΩ before the heat-proof test and 94.2 mΩ after the heat-proof test. Thus, the contact resistance after the heat-proof test was not a good value which was not higher than 5 mΩ, so that the contact resistance was raised after the heat-proof test. Moreover, cracks were observed in the silver-plated product after bending, and the base material was exposed, so that the bendability of the silver-plated product was not good.

Comparative Example 5

A silver-plated product was produced by the same method as that in Example 1, except that the material to be plated and a silver electrode plate were used as a cathode and an anode, respectively, to electroplate (silver-plate) the material at a current density of 5 A/dm² and a liquid temperature of 18° C. in a silver plating bath comprising 148 g/L of silver potassium cyanide, 140 g/L of potassium cyanide and 73 mg/L of potassium selenocyanate, while stirring the solution at 400 rpm by a stirrer, until a silver plating film having a thickness of 3 μm was formed. Furthermore, in the used silver plating bath, the concentration of Se was 40 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 4.0%. The contact resistance of the silver-plated product was 0.7 mΩ before the heat-proof test and 574.5 mΩ after the heat-proof test. Thus, the contact resistance after the heat-proof test was not a good value which was not higher than 5 mΩ, so that the contact resistance was raised after the heat-proof test. Moreover, cracks were observed in the silver-plated product after bending, and the base material was exposed, so that the bendability of the silver-plated product was not good.

Comparative Example 6

A silver-plated product was produced by the same method as that in Example 1, except that the material to be plated and a silver electrode plate were used as a cathode and an anode, respectively, to electroplate (silver-plate) the material at a current density of 5 A/dm² and a liquid temperature of 18° C. in a silver plating bath comprising 148 g/L of silver potassium cyanide, 140 g/L of potassium cyanide and 1 mg/L of potassium selenocyanate, while stirring the solution at 400 rpm by a stirrer, until a silver plating film having a thickness of 3 μm was formed. Furthermore, in the used silver plating bath, the concentration of Se was 0.5 mg/L, and the concentration of Ag was 80 g/L, the concentration of free CN being 56 g/L, and the mass ratio of Ag to free CN being 1.44.

With respect to a silver-plated product thus produced, the area fraction in {200} orientation thereof was calculated by the same method as that in Example 1, and the contact resistances thereof before and after the heat-proof test and the bendability thereof were evaluated by the same methods as those in Example 1. As a result, the area fraction in {200} orientation was 10.4%. The contact resistance of the silver-plated product was 1.0 mΩ before the heat-proof test and 6.5 mΩ after the heat-proof test. Thus, the contact resistance after the heat-proof test was not a good value which was not higher than 5 mΩ, so that the contact resistance was raised after the heat-proof test. Moreover, cracks were observed in the silver-plated product after bending, and the base material was exposed, so that the bendability of the silver-plated product was not good.

Figure 2:
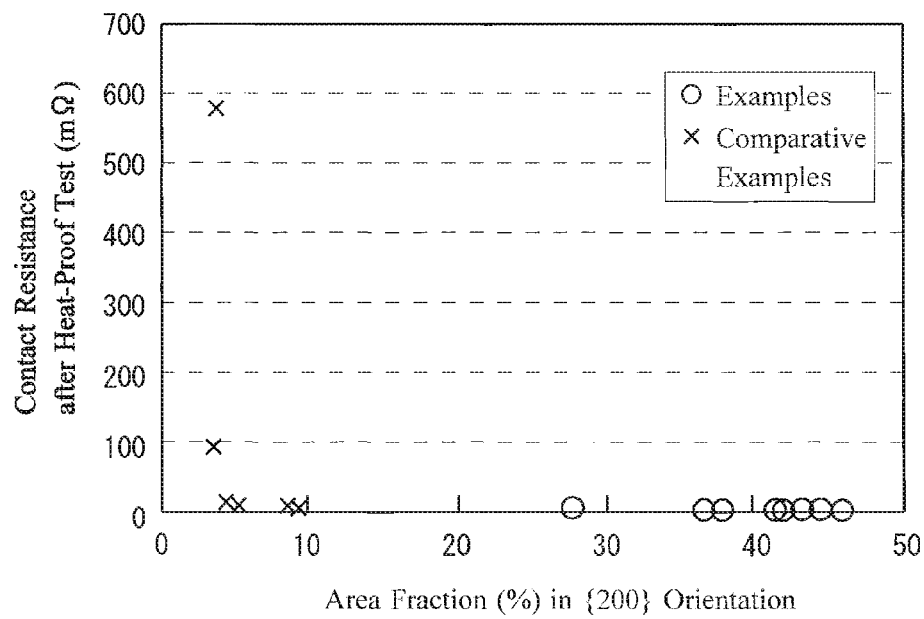
FIG. 2 is a graph showing the contact resistance after the heat-proof test with respect to the area fraction in {200} orientation of silver-plated products obtained in Examples and Comparative Examples.
Figure 3:
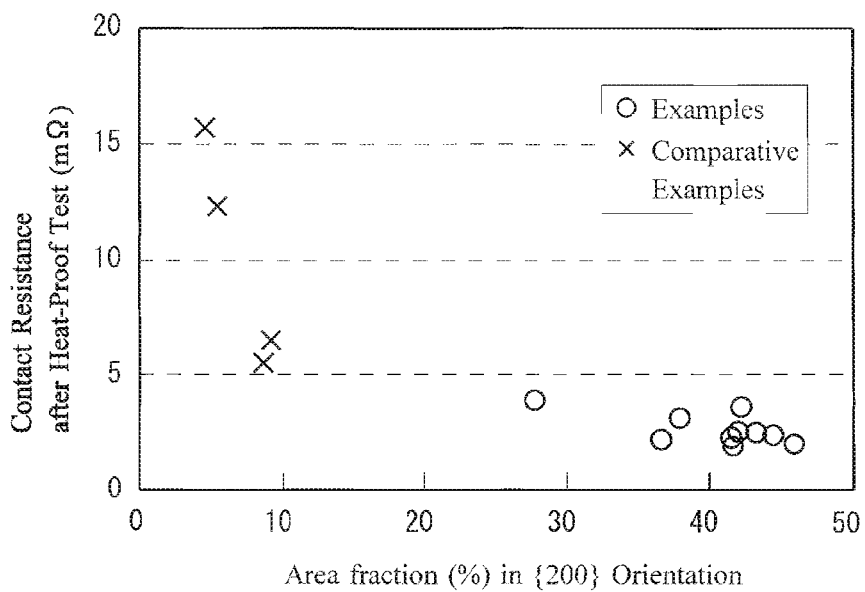
FIG. 3 is a graph showing the contact resistance after the heat-proof test with respect to the area fraction in {200} orientation of silver-plated products obtained in Examples and Comparative Examples.

The producing conditions for the silver-plated product and characteristics thereof in each of Examples and Comparative Examples are shown in Tables 1-3 and FIGS. 1-3.

TABLE 1

| | Composition of Silver Plating Bath | | | | Silver Plating Bath Free | | |
|---|---|---|---|---|---|---|---|
| | KAg(CN)$_2$ (g/L) | KCN (g/L) | KSeCN (mg/L) | Se (mg/L) | Ag (g/L) | CN (g/L) | Ag/Free CN |
| Ex. 1 | 74 | 100 | 18 | 10 | 40 | 40 | 1.00 |
| Ex. 2 | 111 | 100 | 18 | 10 | 60 | 40 | 1.51 |
| Ex. 3 | 111 | 120 | 18 | 10 | 60 | 48 | 1.26 |
| Ex. 4 | 111 | 140 | 18 | 10 | 60 | 56 | 1.08 |
| Ex. 5 | 148 | 120 | 18 | 10 | 80 | 48 | 1.67 |
| Ex. 6 | 148 | 140 | 18 | 10 | 80 | 56 | 1.44 |
| Ex. 7 | 148 | 140 | 11 | 6 | 80 | 56 | 1.44 |
| Ex. 8 | 148 | 140 | 26 | 14 | 80 | 56 | 1.44 |
| Ex. 9 | 148 | 140 | 2 | 1 | 80 | 56 | 1.44 |
| Ex. 10 | 148 | 140 | 6 | 3 | 80 | 56 | 1.44 |
| Ex. 11 | 148 | 140 | 18 | 10 | 80 | 56 | 1.44 |
| Ex. 12 | 148 | 140 | 18 | 10 | 80 | 56 | 1.44 |
| Ex. 13 | 148 | 140 | 26 | 14 | 80 | 56 | 1.44 |
| Ex. 14 | 148 | 140 | 18 | 10 | 80 | 56 | 1.44 |
| Ex. 15 | 148 | 140 | 18 | 10 | 80 | 56 | 1.44 |
| Ex. 16 | 148 | 140 | 18 | 10 | 80 | 56 | 1.44 |
| Comp. 1 | 74 | 140 | 18 | 10 | 40 | 56 | 0.72 |
| Comp. 2 | 148 | 100 | 18 | 10 | 80 | 40 | 2.01 |
| Comp. 3 | 148 | 140 | 36 | 20 | 80 | 56 | 1.44 |
| Comp. 4 | 148 | 140 | 55 | 30 | 80 | 56 | 1.44 |
| Comp. 5 | 148 | 140 | 73 | 40 | 80 | 56 | 1.44 |
| Comp. 6 | 148 | 140 | 1 | 0.5 | 80 | 56 | 1.44 |

TABLE 2

| | Aging Temp. (° C.) | Ag Thickness (μm) | Area Fraction in {200} Orientation (%) |
|---|---|---|---|
| Ex.1 | 25 | 3 | 36.7 |
| Ex.2 | 25 | 3 | 41.9 |
| Ex.3 | 25 | 3 | 43.2 |
| Ex.4 | 25 | 3 | 37.9 |
| Ex.5 | 25 | 3 | 45.9 |
| Ex.6 | 25 | 3 | 41.6 |
| Ex.7 | 25 | 3 | 44.4 |
| Ex.8 | 25 | 3 | 42.2 |
| Ex.9 | 25 | 3 | 27.8 |
| Ex.10 | 25 | 3 | 41.7 |
| Ex.11 | 50 | 3 | 36.6 |
| Ex.12 | 100 | 3 | 31.5 |
| Ex.13 | 50 | 3 | 39.2 |
| Ex.14 | 25 | 1 | 32.8 |
| Ex.15 | 25 | 5 | 56.5 |
| Ex.16 | 25 | 20 | 66.7 |
| Comp.1 | 25 | 3 | 8.9 |
| Comp.2 | 25 | 3 | 5.5 |
| Comp.3 | 25 | 3 | 4.6 |
| Comp.4 | 25 | 3 | 3.9 |
| Comp.5 | 25 | 3 | 4.0 |
| Comp.6 | 25 | 3 | 10.4 |

TABLE 3

| | Contact Resistance before Heat-Proof Test (m Ω) | Contact Resistance after Heat-Proof Test (m Ω) | Bendability (Presence of Exposure of Base Material) |
|---|---|---|---|
| Ex.1 | 0.9 | 2.3 | Not Exposed |
| Ex.2 | 0.8 | 2.5 | Not Exposed |
| Ex.3 | 0.9 | 2.5 | Not Exposed |
| Ex.4 | 0.8 | 3.2 | Not Exposed |
| Ex.5 | 0.7 | 2.0 | Not Exposed |
| Ex.6 | 0.9 | 2.4 | Not Exposed |
| Ex.7 | 1.0 | 2.4 | Not Exposed |
| Ex.8 | 0.8 | 3.6 | Not Exposed |
| Ex.9 | 1.0 | 3.9 | Not Exposed |
| Ex.10 | 1.0 | 1.9 | Not Exposed |
| Comp.1 | 0.8 | 5.6 | Exposed |
| Comp.2 | 0.9 | 12.3 | Exposed |
| Comp.3 | 0.9 | 15.7 | Exposed |
| Comp.4 | 0.7 | 94.2 | Exposed |
| Comp.5 | 0.7 | 574.5 | Exposed |
| Comp.6 | 1.0 | 6.5 | Exposed |

Figure 4:
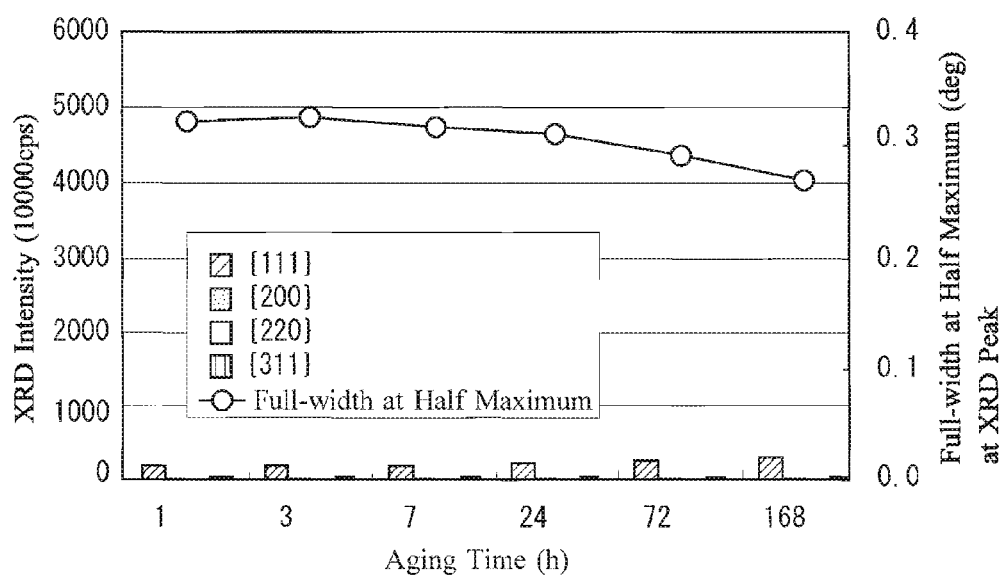
FIG. 4 is a graph showing the intensity at the X-ray diffraction (XRD) peak on each of {111}, {200}, {220} and {311} planes of the silver plating film, and the full-width at half maximum of a diffraction intensity curve at the XRD peak on {111} plane, with respect to the aging time for the silver-plated product obtained in Comparative Example 4.
Figure 5:
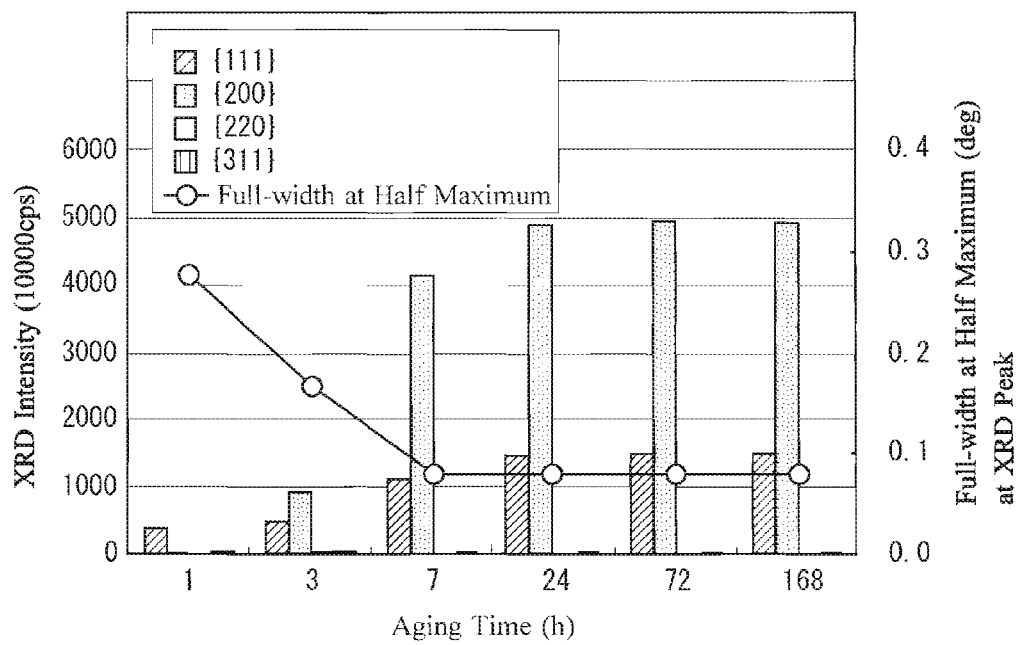
FIG. 5 is a graph showing the intensity at the X-ray diffraction (XRD) peak on each of {111}, {200}, {220} and {311} planes of the silver plating film, and the full-width at half maximum of a diffraction intensity curve at the XRD peak on {111} plane, with respect to the aging time for the silver-plated product obtained in Example 7.

With respect to the silver-plated products in Comparative Example 4 and Example 7, the intensities (10000 cps) at the X-ray diffraction (XRD) peak on each of {111}, {200}, {220} and {311} planes of the silver plating film were obtained when the aging time was 1, 3, 7, 24, 72 and 168 hours, respectively, and the full-width at half maximum of a diffraction intensity curve at the XRD peak on {111} plane was obtained. Furthermore, an X-ray diffraction (XRD) analyzer (a full-automatic multi-purpose horizontal X-ray diffractometer Smart Lab produced by Rigaku Corporation) was used for obtaining each of the intensities at the X-ray diffraction (XRD) peak by scanning in a scanning range of 2θ/θ using an X-ray tube of Cu and a Kβ filter after 1, 3, 7, 24, 72 and 168 hours, respectively, immediately from the silver plating, while holding the silver-plated product at a temperature of 25° C. and a relative humidity of 50% RH. As a result, in the case of the silver-plated product in Comparative Example 4 as shown in FIG. 4, the intensity at the X-ray diffraction (XRD) peak on {200} plane and the full-width at half maximum of the diffraction intensity curve at the XRD peak on {111} plane were hardly changed by the aging treatment, whereas in the case of the silver-plated product in Example 7 as shown in FIG. 5, the intensity at the X-ray diffraction (XRD) peak on {200} plane was remarkably increased by the aging treatment, and the full-width at half maximum of the diffraction intensity curve at the XRD peak on {111} plane was remarkably decreased by the aging treatment. This shows that, in the case of the silver-plated product in Comparative Example 4, the aging treatment after the silver plating does not greatly change the crystal state, whereas in the case of the silver-plated product in Example 7, the aging treatment after the silver plating causes recrystallization, and the crystals thus formed are strongly oriented so that {200} plane is directed to the surface (plate surface) of the silver-plated product.

With respect to a commercially available silver-plated product, in order to express the intensity of orientation on {200} plane to the normal direction (ND) to the surface (plate surface) by a percentage occupied by {200} crystal plane on the plate surface, a square of 100 μm×100 μm on the surface of the silver-plated product was measured at a step of 0.4 μm by means of a thermal field emission-type scanning electron microscope (JSM-7800F produced by JEOL Ltd.), and a proportion occupied by crystals having {200} orientation directed to a normal direction (ND) to the surface of the silver-plated product (with a permissible deviation in angle of 10° or less) was analyzed by the electron backscatter diffraction (EBSD) using a crystal analysis tool for scanning electron microscope (OIM produced by TSL solutions Co., Ltd.). As a result, the area fraction in {200} orientation was in the range of from 4.1% to 4.6%. With respect to a silver-plated product having non-orientation (an imaginary silver-plated product wherein crystals forming a silver plating film are oriented at random), the area fraction in {200} orientation thereof was calculated. As a result, it was 4.6%. On the other hand, the area fraction in {200} orientation of each of the silver-plated products in Examples 1 to 16 was in the range of from 27.8% to 66.7%. It was found that the area fraction in {200} orientation thereof was very high (above ten times) as compared with those of the commercially available silver-plate product and the imaginary silver-plated product estimated so as to be oriented at random. This shows that most of crystals in the silver plating film of the surface layer of the silver-plated product in each of Examples 1 through 16 are strongly oriented so that {200} plane is directed to the surface (plate surface) of the silver-plated product. Furthermore, although it is known that a copper alloy plate having a high area fraction in {200} orientation and a high twin crystal density has an excellent bendability, it was found that a silver-plated product having a high area fraction in {200} orientation as that in Examples 1 through 16 has an excellent bendability.

Figure 6:
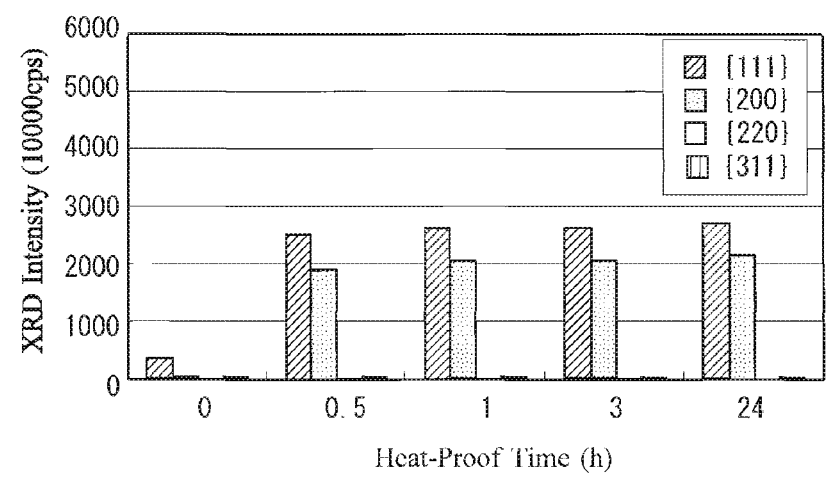
FIG. 6 is a graph showing the intensity at the X-ray diffraction (XRD) peak on each of {111}, {200}, {220} and {311} planes of the silver plating film, with respect to the heat-proof time for the silver-plated product obtained in Comparative Example 4.
Figure 7:
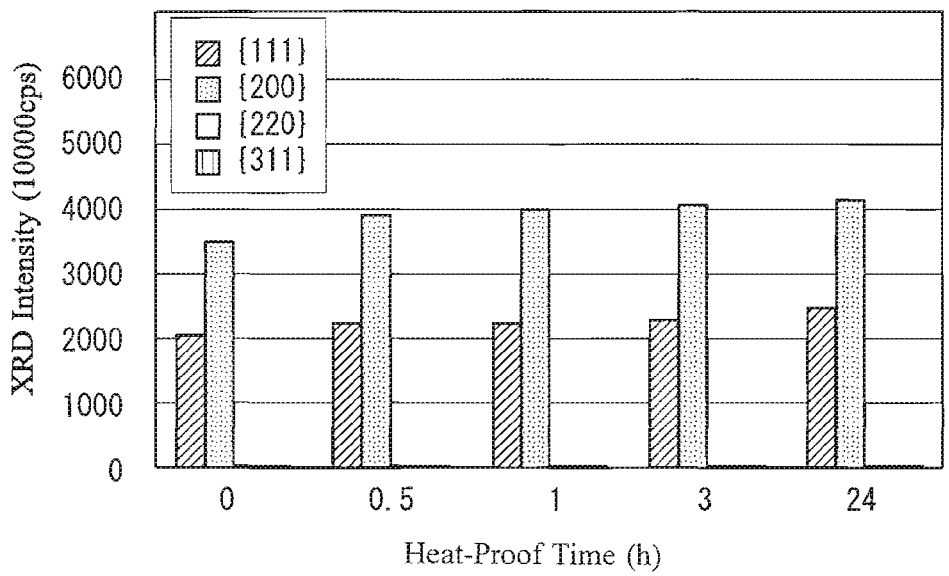
FIG. 7 is a graph showing the intensity at the X-ray diffraction (XRD) peak on each of {111}, {200}, {220} and {311} planes of the silver plating film, with respect to the heat-proof time for the silver-plated product obtained in Example 6.

With respect to the silver-plated products in Comparative Example 4 and Example 6, the intensities (10000 cps) at the X-ray diffraction (XRD) peak on each of {111}, {200}, {220} and {311} planes of the silver plating film were obtained when the silver-plated products were held at 200° C. for 0.5, 1, 3 and 24 hours, respectively. Furthermore, an X-ray diffraction (XRD) analyzer (a full-automatic multi-purpose horizontal X-ray diffractometer Smart Lab produced by Rigaku Corporation) was used for obtaining each of the intensities at the X-ray diffraction (XRD) peak by scanning in a scanning range of 2θ/θ using an X-ray tube of Cu and a Kβ filter after 0.5, 1, 3 and 24 hours, respectively, immediately from the silver plating, while holding the silver-plated products at a temperature of 200° C. As a result, in the case of the silver-plated product in Comparative Example 4 as shown in FIG. 6, the intensities at the X-ray diffraction (XRD) peak on each of {111}, {200}, {220} and {311} planes were remarkably increased when it was held at a high temperature (200 V), whereas in the silver-plated product in Example 6 as shown in FIG. 7, the intensities at the X-ray diffraction (XRD) peak on each of {111}, {200}, {220} and {311} planes were hardly changed even if it was held at a high temperature (200° C.). This shows that, if the silver-plated product in Comparative Example 4 is held at a high temperature, the crystal state of the silver plating film is changed to cause a grain boundary diffusion, whereas in the case of the silver-plated product in Example 6, the crystal film of the silver plating recrystallized by the aging treatment becomes a very stable state (after recrystallization is caused once), so that it is difficult to change the crystal state thereof. Thus, the silver-plated product in Example 6 becomes a very high heat resistance as compared with that in Comparative Example 4.

Figure 8:
FIG. 8 is a backscattered electron image of a cross-section of the silver plating film of the silver-plated product obtained in Example 6, the image being obtained by a field emission-type scanning electron microscope (FE-SEM)
Figure 9:
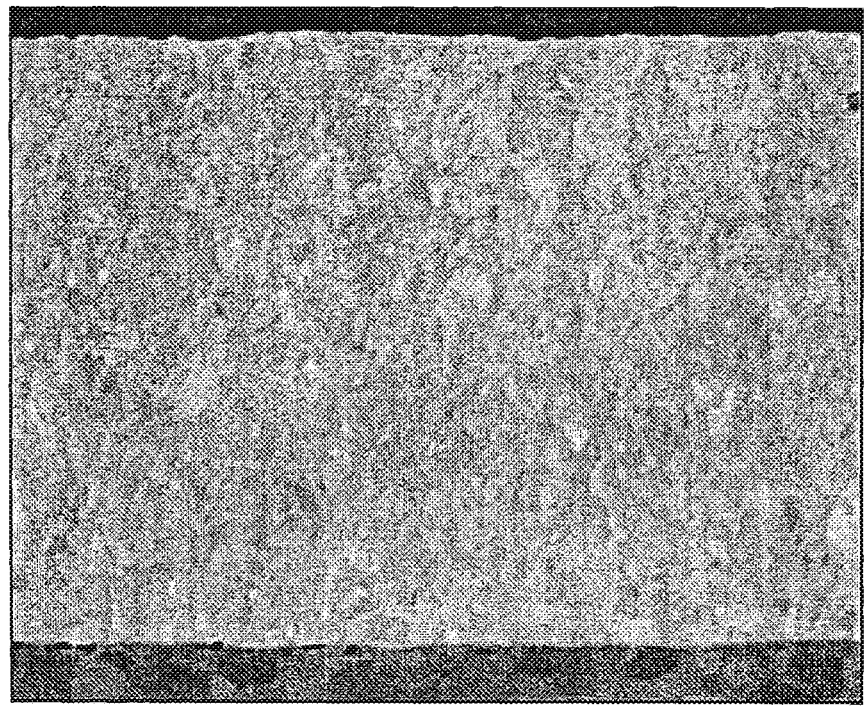
FIG. 9 is a backscattered electron image of a cross-section of the silver plating film of the silver-plated product obtained in Comparative Example 4, the image being obtained by the FE-SEM.

FIGS. 8 and 9 show a backscattered electron image of a cross-section of the silver plating film of each of the silver-plated products in Example 6 and Comparative Example 4, the image being obtained by a thermal field emission-type scanning electron microscope (JSM-7800F produced by JEOL Ltd.). As shown in these figures, it is found that in the case of the silver-plated product in Example 6, the size of crystals is very large as compared with the silver-plated produce in Comparative Example 4, and the crystals are oriented to a specific direction. This shows that, in the case of the silver-plated product in Example 6, crystalline is improved by recrystallization, so that the number of grain boundaries is decreased. If the number of grain boundaries is thus decreased, when the silver-plated product is held at a high temperature, it is difficult to cause a grain boundary diffusion wherein copper atoms of the base material (or the underlying layer) are diffused in grain boundaries to be exposed to the surface layer, so that the heat resistance thereof is improved.

Figure 10:
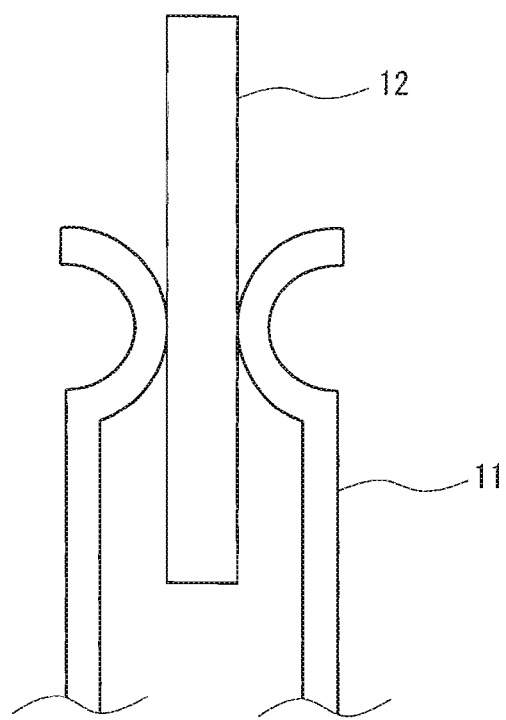
FIG. 10 is schematic diagram showing an example of a connecting terminal using the silver-plated product according to the present invention as the material thereof.

Furthermore, as shown in FIG. 10, if at least one of a female terminal 11 and a male terminal 12 (or a portion of one contacting the other) of a connecting terminal comprising the female terminal 11 and the male terminal 12 fitted into the female terminal 11 is made of a silver-plated product according to the present invention, it is possible to produce a connecting terminal wherein it is difficult to form cracks by bending during press working and which can restrain the rise of the contact resistance thereof when it is used in a high temperature environment. Therefore, the silver-plated product can be used as the material of charge terminals and high-pressure connectors of electric vehicles (EVs) and hybrid electric vehicles (HEVs), in which heavy-current flow and which have large heating values.

A silver-plated product according to the present invention can be used as the material of contact and terminal parts, such as connectors, switches and relays, which are used for on-vehicle and/or household electric wiring. In particular, the silver-plated product can be used as the material of spring-loaded contact members for switches, as well as the material of switches of portable cellular phones and/or remote controllers of electrical apparatuses. The silver-plated product can be also used as the material of charge terminals and high-pressure connectors of hybrid electric vehicles (HEVs) in which heavy-current flow and which have large heating values.

The invention claimed is:

1. A silver-plated product comprising:
    a base material; and
    a surface layer consisting of silver which is formed on a surface of the base material or on a surface of an underlying layer formed on the base material,
    wherein an area fraction in {200} orientation of the surface layer is 15% or more.

2. A silver-plated product as set forth in claim 1, wherein said surface layer is formed on the surface of the base material of copper or a copper alloy, or on the surface of the underlying layer of copper or a copper alloy formed on the base material.

3. A contact or terminal part which is made of a silver-plated product as set forth in claim 1.

4. A silver-plated product as set forth in claim 1, wherein an entire surface of said surface layer is a surface of silver.

* * * * *